(12) United States Patent
Facchinello et al.

(10) Patent No.: US 9,211,834 B2
(45) Date of Patent: Dec. 15, 2015

(54) TRI-FOLD HARD TONNEAU COVER WITH HINGED FRONT OPENING

(71) Applicant: Extang Corporation, Ann Arbor, MI (US)

(72) Inventors: Jerome Facchinello, Grand Blanc, MI (US); William Reminder, Ann Arbor, MI (US)

(73) Assignee: Extang Corporation, Ann Arbor, MI (US)

( * ) Notice: Subject to any disclaimer, the term of this patent is extended or adjusted under 35 U.S.C. 154(b) by 0 days.

(21) Appl. No.: 14/284,761

(22) Filed: May 22, 2014

(65) Prior Publication Data

US 2015/0061315 A1 Mar. 5, 2015

Related U.S. Application Data

(60) Provisional application No. 61/871,359, filed on Aug. 29, 2013.

(51) Int. Cl.
*B60P 7/00* (2006.01)
*B60P 7/02* (2006.01)

(52) U.S. Cl.
CPC ........................ *B60P 7/02* (2013.01)

(58) Field of Classification Search
CPC ........................................................ B60P 7/02
USPC ............ 296/100.01, 100.02, 100.06, 100.07, 296/100.08, 100.09
See application file for complete search history.

(56) References Cited

U.S. PATENT DOCUMENTS

| 4,418,954 | A | * | 12/1983 | Buckley | 296/100.09 |
|---|---|---|---|---|---|
| 4,747,441 | A | | 5/1988 | Apolzer et al. | |
| 4,844,531 | A | | 7/1989 | Kooiker | |
| 4,946,217 | A | | 8/1990 | Steffens et al. | |
| 5,087,093 | A | * | 2/1992 | Repetti | 296/100.09 |
| 5,427,428 | A | | 6/1995 | Ericson et al. | |
| 5,653,491 | A | | 8/1997 | Steffens et al. | |
| 5,961,173 | A | * | 10/1999 | Repetti | 296/37.6 |
| 6,422,635 | B1 | | 7/2002 | Steffens et al. | |
| 6,454,337 | B2 | | 9/2002 | Steffens et al. | |
| 6,520,559 | B1 | | 2/2003 | Steffens et al. | |
| 6,527,330 | B1 | | 3/2003 | Steffens et al. | |
| 6,565,141 | B1 | | 5/2003 | Steffens et al. | |
| 6,899,372 | B1 | * | 5/2005 | Keller | 296/100.09 |

(Continued)

OTHER PUBLICATIONS

Design Issues on Living Hinges, Date Unknown, Author Unknown, 9 pages. Available at: http://web.mit.edu/2.75/resources/random/Living%20Hinge%20Design.pdf.

*Primary Examiner* — Joseph D Pape
(74) *Attorney, Agent, or Firm* — Harness, Dickey & Pierce, PLC

(57) ABSTRACT

A tonneau cover system for a cargo box of a pickup truck having a first tonneau section, a second tonneau section, and a third tonneau section. A first hinge system hingedly couples the first and second sections to permit pivotal stacked nesting of the first section relative to the second section. A second hinge system hingedly couples the second section to an attachment member assembly, which is connected to the cargo box, to permit pivotal stacked nesting of the combination of the first and second sections relative to the third section. Finally, a third hinge system hingedly couples the third section to a front mounting bar assembly, which is connected to the front wall of the cargo box, to permit pivotal movement of only the third tonneau section into a raised position.

20 Claims, 10 Drawing Sheets

(56) References Cited

U.S. PATENT DOCUMENTS

| | | |
|---|---|---|
| 7,021,693 B2 | 4/2006 | Keller |
| 7,052,071 B2 | 5/2006 | Mulder et al. |
| 7,334,830 B2 * | 2/2008 | Weldy ................... 296/100.09 |
| 7,537,264 B2 | 5/2009 | Maimin et al. |
| 7,735,881 B2 | 6/2010 | Steffens et al. |
| 7,828,361 B1 | 11/2010 | Spencer |
| 8,061,758 B2 | 11/2011 | Maimin et al. |
| 8,256,820 B2 | 9/2012 | Spencer |
| 8,262,148 B2 | 9/2012 | Rusher et al. |
| 8,672,388 B2 | 3/2014 | Rusher et al. |
| 2001/0035664 A1 * | 11/2001 | Steffens et al. .......... 296/100.09 |

* cited by examiner

TRI-FOLD HARD TONNEAU COVER WITH HINGED FRONT OPENING

CROSS-REFERENCE TO RELATED APPLICATIONS

This application claims the benefit of U.S. Provisional Application No. 61/871,359, filed on Aug. 29, 2013. The entire disclosure of the above application is incorporated herein by reference.

FIELD

The present disclosure relates to relates to coverings for pickup trucks and, more particularly, relates to a hard tonneau cover system having a plurality of stackable sections being hinged to permit forward-folding (relative to the pickup truck) access of the vehicle bed.

BACKGROUND

This section provides background information related to the present disclosure which is not necessarily prior art.

Tonneau covers have been used for a number of years to cover the cargo box of pickup trucks against dirt, debris, and other environmental contaminants and to improve the aesthetic quality thereof. Originally, tonneau covers were designed by upholstery shops and typically made of vinyl covered fabrics or canvas. The material was often doubled over along its edges for added strength and appearance. Male snaps were then attached to the sides of the cargo box of the pickup truck via fasteners, while female snaps were attached along the edges of the cover. Wooden bows were sometimes used to span the cargo box and ensure that the cover remained high enough to drain water. Unfortunately, these covers were sometimes difficult to handle and/or manufacture, and occasionally failed to protect the cargo box.

More recently, foldable tonneau covers are often more desirable in that they conveniently cover the bed of the pickup truck for cargo protection. However, when not in use, the foldable tonneau cover may be folded toward the rear of the passenger cabin (or other location). Generally, foldable tonneau covers include a frame network of cross bows, a tarp or covering operably coupled to and spanning the frame network, a latching system for coupling the frame network to the pickup truck and a means for stowing the latching system, and a hinge system for hingedly coupled adjacent sections of the foldable tonneau cover.

Unfortunately, in many conventional foldable tonneau cover systems, the foldable sections of the tonneau cover are folded from the rear end of the pickup truck bed toward the forward end of the pickup truck bed adjacent the cab into a stacked configuration. In this way, a substantially portion of the tonneau cover remains covering the pickup truck bed when stacked. The size of the remaining portion is typically equal to the footprint, when viewed from above, of the stacked foldable sections. In other words, the size of the tonneau cover system that remains covering the pickup truck bed is typically about the size of a single foldable section, because at least one of the foldable sections is not typically folded away from the pickup truck bed and thus remains in a position concealing complete access of the pickup truck bed.

In order to gain complete access to the pickup truck bed, or at least maximize access to the bed, when using a conventional foldable tonneau cover system, one must completely remove the tonneau cover system from the pickup truck. However, it should be appreciated that full removal of the conventional foldable tonneau cover system is disadvantageous in that it requires storage of the now-removed system either in the bed of the pickup truck, which consumes valuable storage space in the bed, or at an off-truck location, which at a minimum can be inconvenient.

Accordingly, there exists a need in the relevant art to provide a tonneau cover system capable of overcoming the disadvantages of the prior art. Additionally, there exists a need in the relevant art to provide a tonneau cover system having a plurality of foldable sections.

SUMMARY

This section provides a general summary of the disclosure, and is not a comprehensive disclosure of its full scope or all of its features.

According to the principles of the present teachings, a tonneau cover system for a cargo box of a pickup truck is provided having advantageous construction and methods of operation. The tonneau cover system comprises a first tonneau section, a second tonneau section, and a third tonneau section. A first hinge system hingedly couples the first and second sections to permit pivotal stacked nesting of the first section relative to the second section. A second hinge system hingedly couples the second section to an attachment member assembly, which is connected to the cargo box, to permit pivotal stacked nesting of the combination of the first and second sections relative to the third section. Finally, a third hinge system hingedly couples the third section to a front mounting bar assembly, which is connected to the front wall of the cargo box, to permit pivotal movement only the third tonneau section into a raised position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
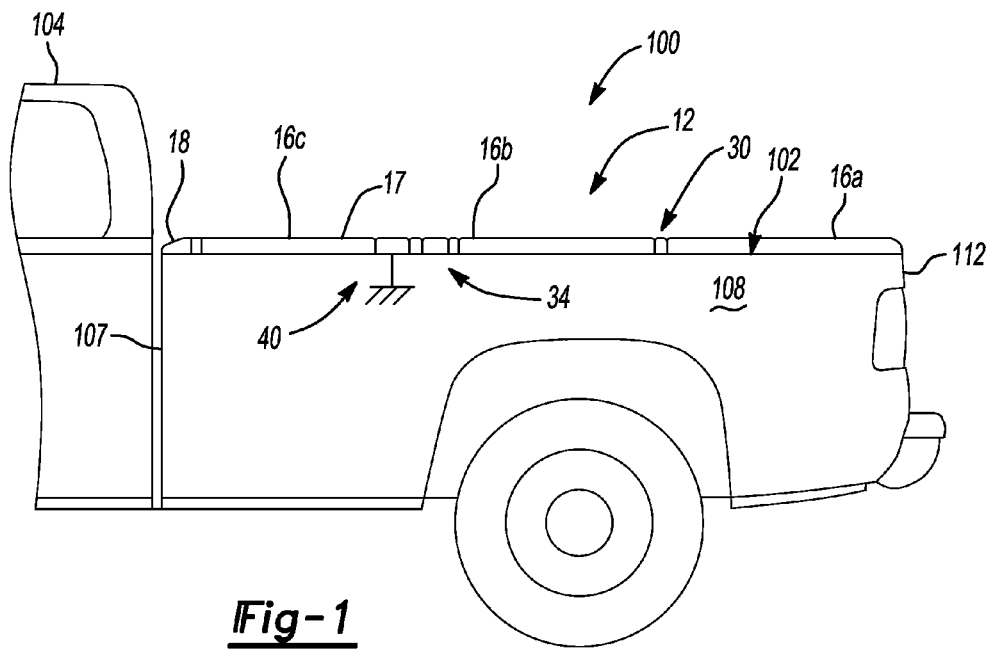
FIG. 1 is a perspective view illustrating a folding tonneau cover according to the principles of the present teachings positioned upon a cargo box of a pickup truck.
Figure 2:
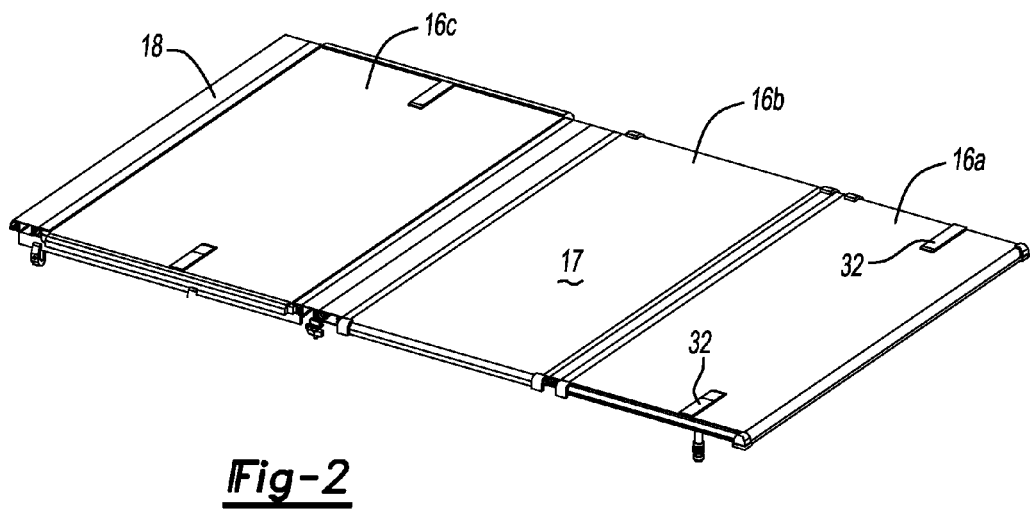
FIG. 2 is a perspective view illustrating the folding tonneau cover in a closed and lowered position.
Figure 3:
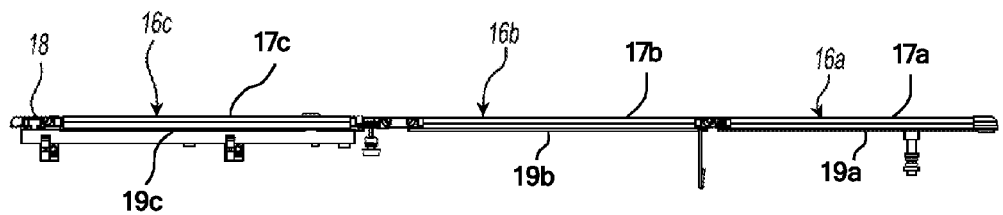
FIG. 3 is a side view illustrating the folding tonneau cover in a closed and lowered position.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a pickup truck 100 is shown having a foldable tonneau system 12 for use with pickup truck 100. Pickup truck 100 generally includes a cargo box 102 and a passenger cabin 104. Cargo box 102 includes a front wall 107, a pair of sidewalls 108, and a rear wall or tailgate 112. It should be understood that the pair of sidewalls 108 includes a left sidewall and a right sidewall that are generally identical, yet arranged in mirrored symmetry.

Referring now to FIGS. 1-10, foldable tonneau system 12 includes, in some embodiments, a plurality of hard tonneau panels or sections 16 that collectively form a top surface 17 spanning or otherwise covering cargo box 102 of pickup truck 100. Although the present embodiment will be described in connection with three panels or sections 16, it should be understood that the principles of the present invention are equally applicable to foldable tonneau systems having two, three, four, or more panels or sections. However, again, for purposes of this disclosure, a foldable tonneau system having three tonneau sections 16a, 16b, and 16c will be described having top surfaces 17a, 17b, and 17c and bottom surfaces 19a, 19b, and 19c, respectively. This configuration should not be regarded as limiting the claims herein. Tonneau sections 16a-16c may be referred to herein as first tonneau section 16a, second tonneau section 16b, and third tonneau section 16c. Generally, first tonneau section 16a, for purposes of discussion, is the most rearward panel or section relative to the pickup truck 100. That is, first tonneau section 16a is located adjacent tailgate 112 of cargo box 102. Second tonneau section 16b is positioned forward of first tonneau section 16a relative to the pickup truck 100. Finally, third tonneau section 16c is positioned forward of second tonneau section 16b relative to the pickup truck 100. That is, third tonneau section 16c is located adjacent front wall 107 of cargo box 102, such that second tonneau section 16b is located between first tonneau section 16a and third tonneau section 16c, thereby spanning cargo box 102 and providing a sealing cover thereon.

In some embodiments, first tonneau section 16a and second tonneau section 16b are configured to be coupled to sidewalls 108 of cargo box 102 to retain first tonneau section 16a and second tonneau section 16b in coupled engagement with pickup truck 100. First tonneau section 16a and second tonneau section 16b are configured to be selectively and conveniently coupled to sidewalls 108 or tailgate 112 to permit easy access to the rearward contents of cargo box 102. Generally speaking, first tonneau section 16a and second tonneau section 16b can collectively be referred to as a rear cover portion that covers a rear portion (e.g. two-thirds or other fraction depending on the size and number of tonneau sections employed) of cargo box 102.

Similarly, in some embodiments, third tonneau section 16c is configured to be coupled to at least one of front wall 107 and sidewalls 108 of cargo box 102 to retain third tonneau section 16c in coupled engagement with pickup truck 100. Third tonneau section 16c is configured to be selectively and conveniently coupled to front wall 107 and/or sidewalls 108 of pickup truck 100 to permit easy access to the forward contents of cargo box 102. In some embodiments, as described herein, third tonneau section 16c can be pivotally coupled to front wall 107 of cargo box 102 via a front mounting bar assembly 18. Generally speaking, third tonneau section 16c and front mounting bar assembly 18 can collectively be referred to as a front cover portion that covers a front portion (e.g. one-third or other fraction depending on the size and number of tonneau sections employed) of cargo box 102.

Figure 10:
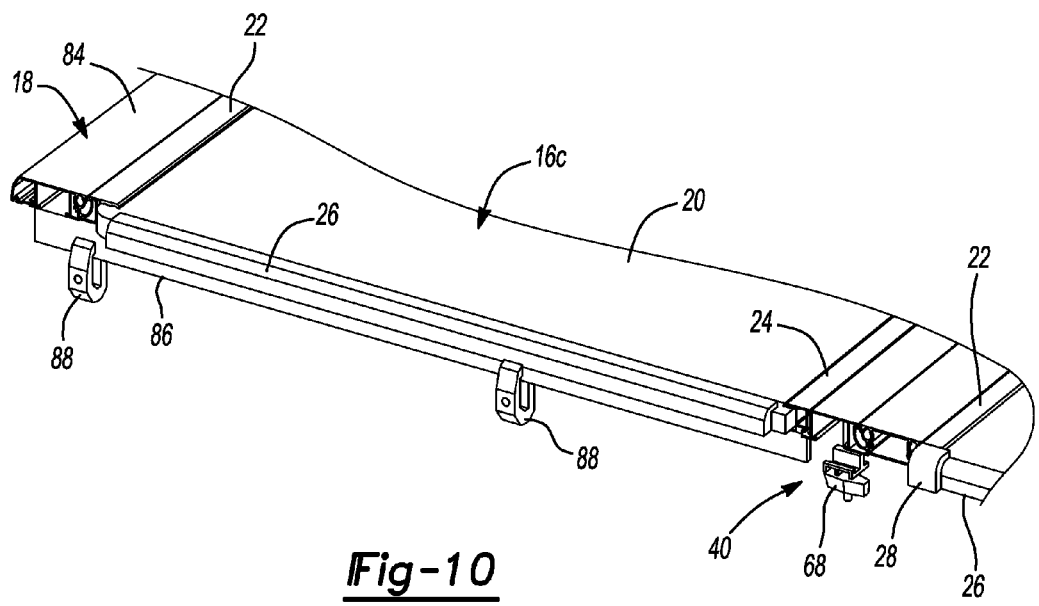
FIG. 10 is an enlarged perspective view illustrating the second tonneau section and third tonneau section and associated attachment member assembly and front mounting bar assembly with portions removed for clarity.

In some embodiments, each of the plurality of tonneau sections 16a-16c includes a generally rigid central panel member having optional side members that together generally forms a rectangular frame. It should be appreciated that in some embodiments, each of the plurality of tonneau sections 16a-16c can comprise a plurality of frame members and/or bow members that together form a rectangular frame that can be covered with a (soft) covering member, such as a fabric. It should thus be understood that the present disclosure can be used in connection with soft panels and, thus, the disclosure should not be regarded as being limited to hard or rigid panels only. However, for purposes of the present discussion, each of the plurality of tonneau sections 16a-16c will be described in connection with a rigid central panel member. Specifically, as illustrated in FIG. 10, each of the plurality of tonneau sections 16a-16c can comprise a central rigid member 20 having a front rail member 22 and rear rail member 24 together coupled to a pair of side members 26 via corner inserts 28. Corner inserts 28 may include a pair of male portions (not shown) sized to be fixedly received and engaged within front rail member 22 and the pair of side members 26. It should be understood that the exact cross-sectional profile of each of the rail members may vary from each other as necessary. For example, in some embodiments, front and/or rear rail members may include features to permit hinging coupling with adjacent panels or other structures. Additionally, alternative features can be used, such as integrally forming decorative edges and/or hinging components.

Figure 18:
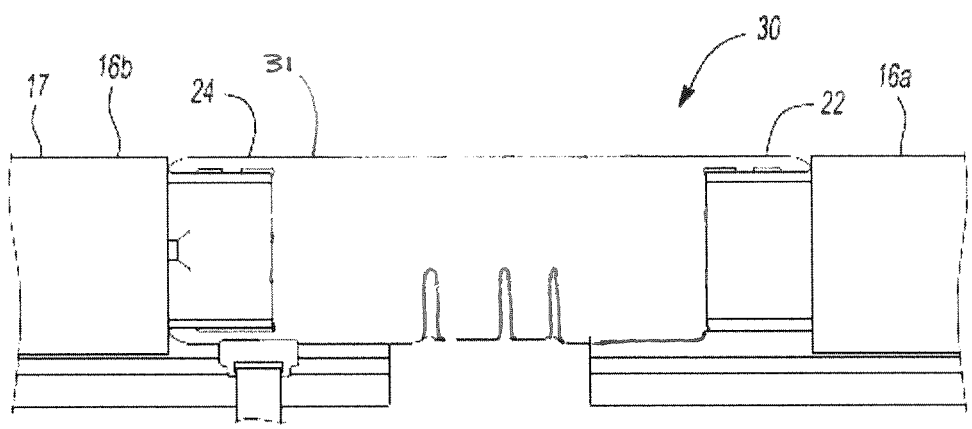
FIG. 18 is an enlarged side view illustrating a first living hinge assembly disposed between the first tonneau section and the second tonneau section.

The hinging connections associated with the present teachings will be described herein in connection with rigid hinge components. It should be understood that each of the hinge members described herein can comprise rigid hinge components and/or living hinge components. Living hinge components 31 can comprise any member that permits articulation through inherent material characteristics (e.g. elastic deformation), such as illustrated in FIG. 18. In some embodiments, living hinge components can include members that are integrally formed with associated structure (e.g. panel member 20 and/or front rail member 22, rear rail member 24, and/or side members 26. Therefore, the specific recitation herein to rigid hinge components should not be regarded as limiting the application or claims, but should be understood as being alternative hinge configurations.

Figure 5:
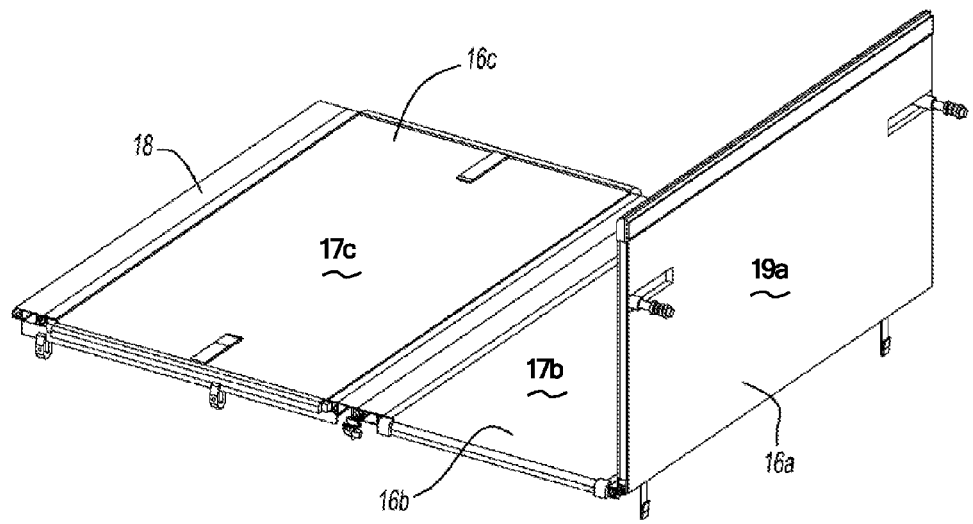
FIG. 5 is a perspective view illustrating the folding tonneau cover having the first tonneau section in a raised position.
Figure 6:
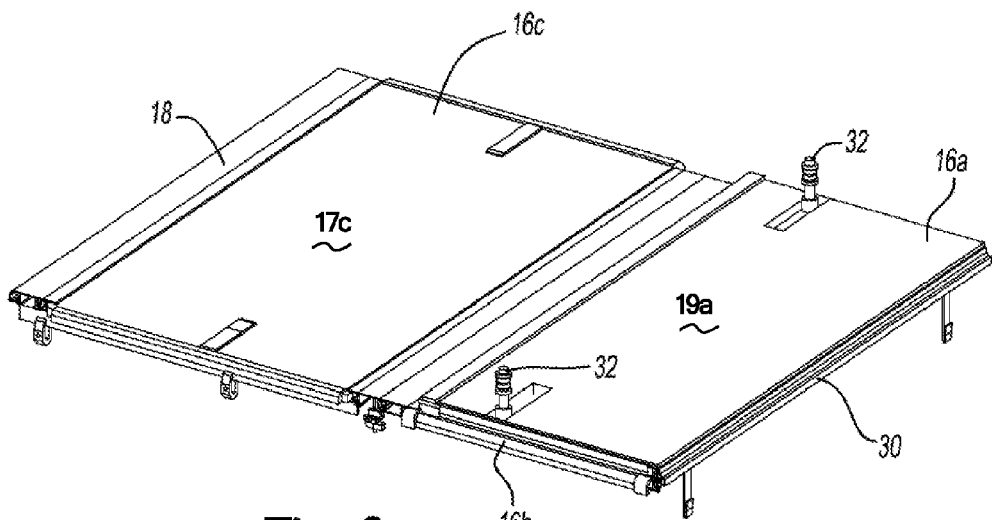
FIG. 6 is a perspective view illustrating the folding tonneau cover with the first tonneau section being folded upon a second tonneau section.
Figure 7:
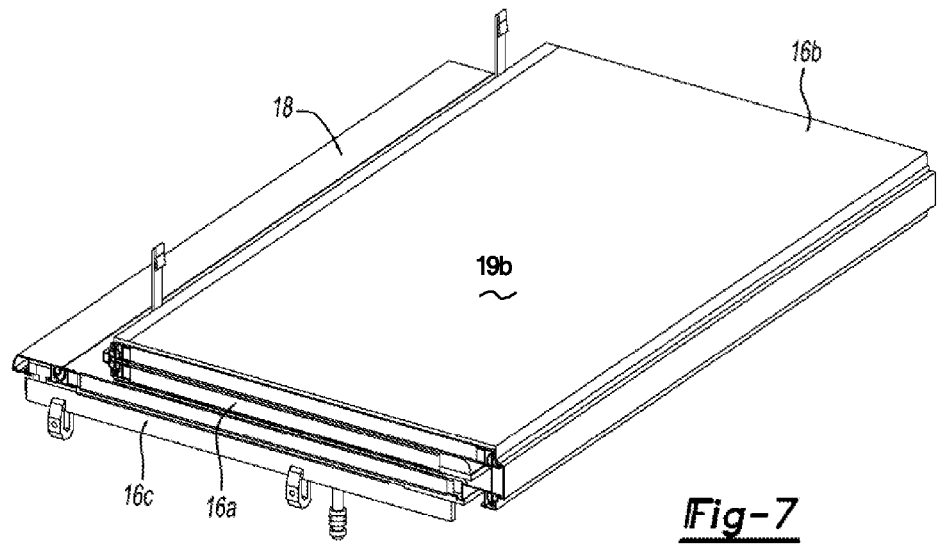
FIG. 7 is a perspective view illustrating the folding tonneau cover with the combination of the first tonneau section and the second tonneau section being folded upon the third tonneau section.

Generally, foldable tonneau system 12 is configured to permit rear cover portion (e.g. first tonneau section 16a and second tonneau section 16b) to be mounted or coupled to cargo box 102 separately from front cover portion (e.g. third tonneau section 16c and front mounting assembly 18) and vice versa. Specifically, as illustrated in FIG. 1, rear cover portion can comprise a first hinge assembly 30 pivotally coupling first tonneau section 16a and second tonneau section 16b. First hinge assembly 30 permits first tonneau section 16a to be articulated or otherwise folded from a lowered and locked position, about first hinge assembly 30, to a first stacked positioned on top of second tonneau section 16b, as illustrated in FIGS. 5-6, such that top surface 17a of first tonneau section 16a generally faces top surface 17b of second tonneau section 16b. First tonneau section 16a can be retained in the initial lowered and locked position via a pair of latch members 32 operably disposed along first tonneau section 16a. Latch members 32 can selectively engage adjacent sidewalls 108 of cargo box 102.

Figure 11:
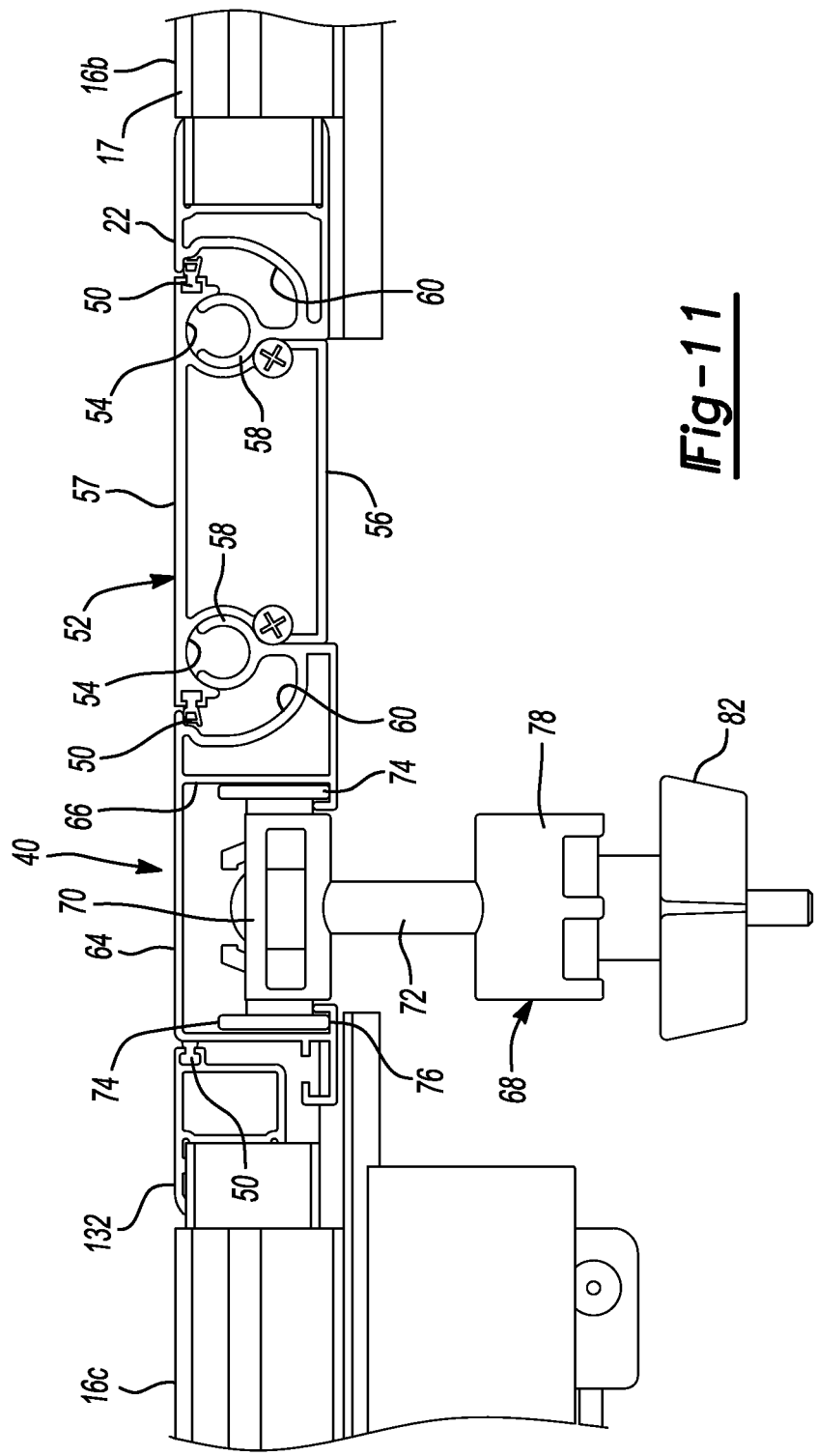
FIG. 11 is an enlarged side view illustrating a second hinge assembly and attachment member assembly disposed between the second tonneau section and the third tonneau section.

Still referring to FIGS. 1 and 11, rear cover portion can further comprise a second hinge assembly 34 pivotally coupled between second tonneau section 16b and an attachment member assembly 40. In this way, second hinge assembly 34 permits articulation of second tonneau section 16b relative to attachment member assembly 40. Attachment member assembly 40 is configured to be fixedly coupled to sidewalls 108 of cargo box 102.

Figure 9:
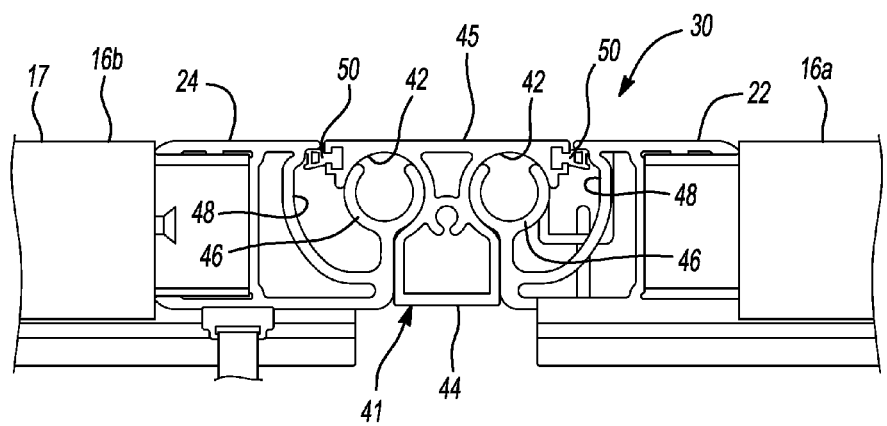
FIG. 9 is an enlarged side view illustrating a first hinge assembly disposed between the first tonneau section and the second tonneau section.

More particularly, with reference to FIG. 9, first hinge assembly 30 can comprise a central hinge member 41 having a pair of arcuate channels 42, a central portion 44 disposed therebetween, and a top surface portion 45 extending along a top surface of first hinge assembly 30. Top surface portion 45 can be generally planar and coplanar with top surface 17 of foldable tonneau system 12. Each of the pair of arcuate channels 42 can be shaped to be substantially cylindrical and sized to receive a corresponding cylindrical member 46 extending from front rail member 22 of first tonneau section 16a and rear rail member 24 of second tonneau section 16b. Cylindrical member 46 is pivotally received within a corresponding one of the pair of arcuate channels 42 such that cylindrical member 46 pivots relative to arcuate channel 42 about an axis—two pivot axes are included in the present embodiment. During such pivotal movement, opposing distal ends of top surface portion 45 sweeps along an arcuate cutout 48 formed in front rail member 22 and rear rail member 24. Seal members 50 can be provided along distal ends of top surface portion 45 for sealing engagement with front rail member 22 and rear rail member 24 to define a generally sealed top surface 17. As described herein, it should be understood that alternative hinge arrangements may be used in connection with the present teachings to permit articulation of first tonneau section 16a relative to second tonneau section 16b between a lowered and locked position and a raised and stacked position. In some embodiments, such alternative hinge arrangement can comprise a single pivot axis.

Figure 8:
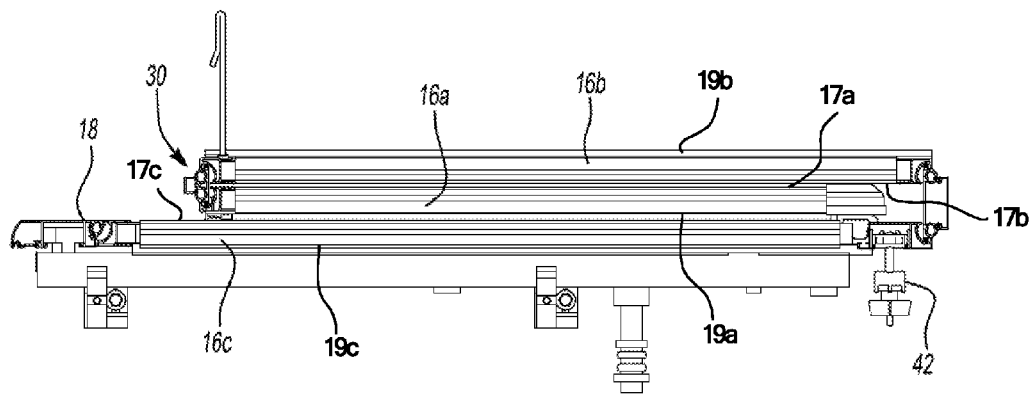
FIG. 8 is a side view illustrating the folding tonneau cover with the combination of the first tonneau section and the second tonneau section being folded upon the third tonneau section.

With reference to FIGS. 1 and 10-12, second hinge assembly 34 can comprise a central hinge member 52 having a pair of arcuate channels 54, a central portion 56 disposed therebetween, and a top surface portion 57 extending along a top surface of second hinge assembly 34. Top surface portion 57 can be generally planar and coplanar with top surface 17 of foldable tonneau system 12. Each of the pair of arcuate channels 54 can be shaped to be substantially cylindrical and sized to receive a corresponding cylindrical member 58 extending from front rail member 22 of second tonneau section 16b and attachment member assembly 40. Cylindrical member 58 is pivotally received within a corresponding one of the pair of arcuate channels 54 such that cylindrical member 58 pivots relative to arcuate channel 54 about an axis. During such pivotal movement, opposing distal ends of top surface portion 57 sweeps along an arcuate cutout 60 formed in attachment member assembly 40 and front rail member 22. Seal members 50 can be provided along distal ends of top surface portion 57 for sealing engagement with attachment member assembly 40 and front rail member 22 to define a generally sealed top surface 17. In some embodiments, central hinge member 52 can be wider, thereby defining a larger or wider central portion, compared to central portion 44 of central hinge member 41 of first hinge assembly 30 to accommodate the increased stacking distance between attachment member assembly 40 and second tonneau section 16b when first tonneau section 16a is disposed therebetween, as illustrated in FIG. 8. That is, when first tonneau section 16a is raised into the stacked position upon second tonneau section 16b and the combination of first tonneau section 16a and second tonneau section 16b is then pivoted about second hinge assembly 34 into a stacked position upon third tonneau section 16c where a bottom surface 19c of first tonneau section 16a generally faces top surface 17c of third tonneau section 16c, central hinge member 52 defines an increased distance between arcuate channels 54 to accommodate the increased stacking thickness.

As described herein, it should be understood that alternative hinge arrangements may be used in connection with the present teachings to permit articulation of first tonneau section 16a relative to second tonneau section 16b and the combination of first tonneau section 16a and second tonneau section 16b relative to third tonneau section 16c between a lowered and locked position and a raised and stacked position.

Figure 12:
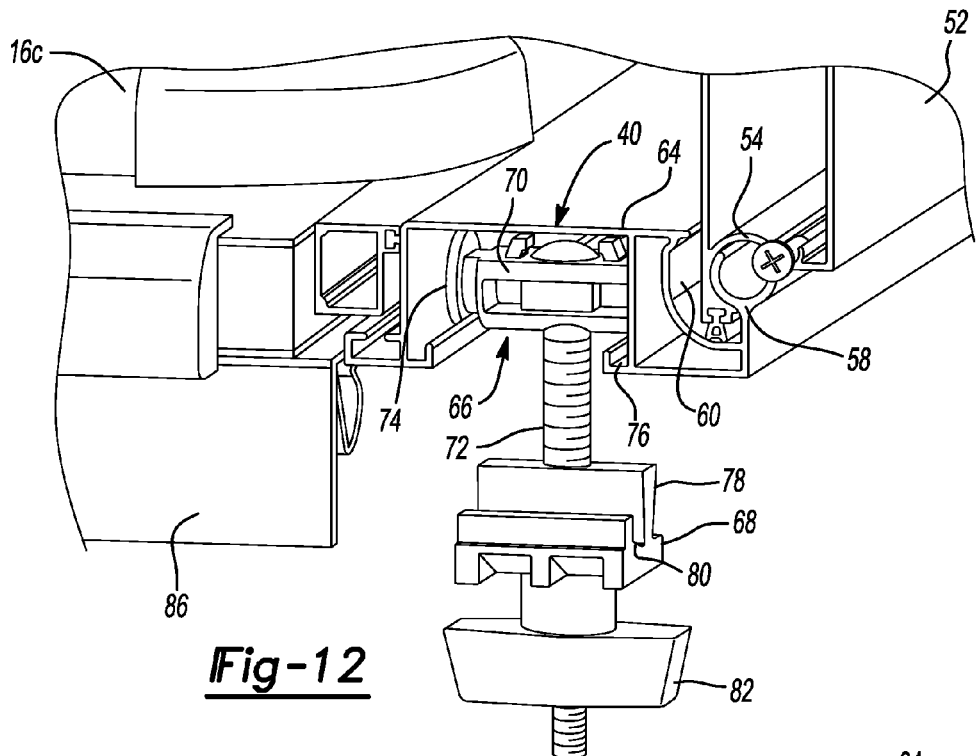
FIG. 12 is an enlarged perspective view illustrating the attachment member assembly with portions removed for clarity.

With particular reference to FIGS. 11-12, attachment member assembly 40 can be used for coupling rear cover portion, namely first tonneau section 16a and second tonneau section 16b, to sidewalls 108 of cargo box 102. Specifically, attachment member assembly 40 can comprise a main member 64 having a C-shaped channel 66 formed there along. C-shaped channel 66 is sized and shaped to slidably receive an attachment member clamp 68 therein. Specifically, attachment member clamp 68 can comprise a generally T-shaped section having a head portion 70 and a downwardly-extending body portion 72. Head portion 70 comprising opposing end portions 74 being enlarged and received with channel features 76 formed in C-shaped channel 66. In this way, attachment member clamp 68 can be slid along channel features 76 of C-shaped channel 66 between a position adjacent and engageable with sidewalls 108 and a position spaced apart and disengaged from sidewalls 108. Attachment member clamp 68 can further comprise a hook member 78 slidably disposed about body portion 72 having a sidewall engaging channel 80 for engaging a flange of sidewall 108. A thumb screw or other fastening device 82 can be threadedly engaged along corresponding threads formed on body portion 72 to permit application of clamping force upon hook member 78 when engaging sidewall 108. In this way, main member 64 of attachment member assembly 40, which rests upon a top surface of sidewall 108, is clampingly engaged with sidewall 108 to retain attachment member assembly 40 (together with first tonneau section 16a and second tonneau section 16b) with cargo box 102. In this way, attachment member assembly 40 can be positioned a predetermined distance rearward of third tonneau section 16c and/or front wall 107 and can engage and/or cooperate with third tonneau section 16c to form a continuous tonneau cover surface.

Figure 13:
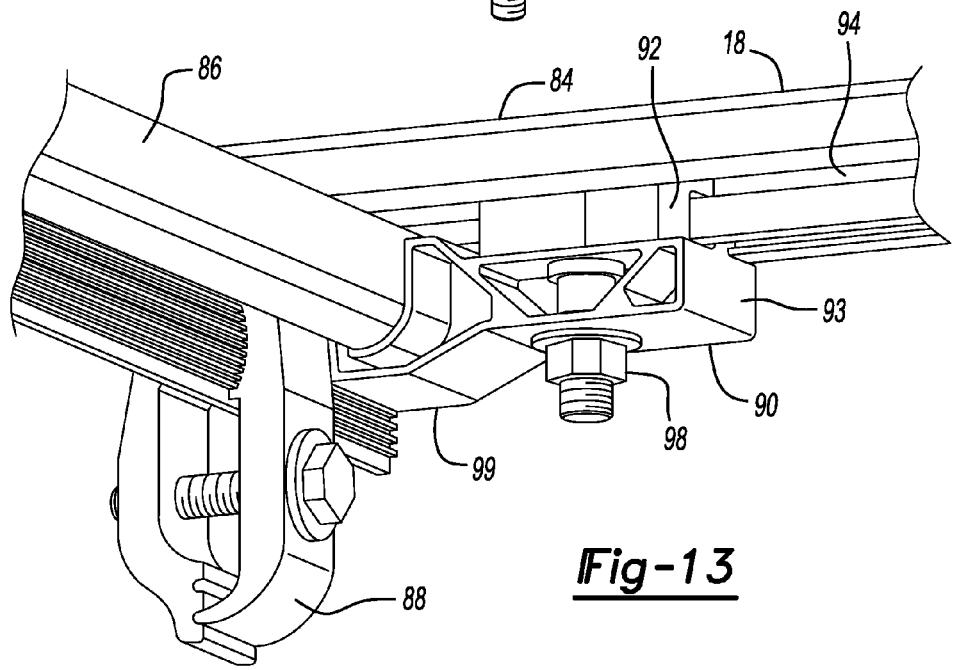
FIG. 13 is an enlarged, lower perspective view illustrating the front mounting bar assembly with portions removed for clarity.

With particular reference to FIGS. 1, 10, 13, 14, and 17, in some embodiments, front cover portion comprises third tonneau section 16c and front mounting bar assembly 18. As described herein, in some embodiments, third tonneau section 16c is pivotally coupled to front mounting bar assembly 18, which is in turn coupled to cargo box 102, to permit third tonneau section 16c to pivot upward along a forward pivot axis to a position generally vertical adjacent the passenger cabin 104 of pickup truck 100. To this end, front mounting bar assembly 18 can comprise a transverse main member 84 extending transverse across cargo box 102 and fixedly coupled to a pair of opposing longitudinal side rail members 86. Longitudinal side rail members 86 extending along sidewalls 108 of cargo box 102 and are fixedly retained thereto via clamps 88 or other suitable fastening device. Transverse main member 84 can be fixedly coupled to the pair of opposing longitudinal side rail members 86 via a slidable clamp member 90 (FIG. 13). Slidable clamp member 90 comprises a T-shaped member 92 extending along a top portion thereof that is slidable received within a corresponding channel 94 formed in transverse main member 84. T-shaped member 92 is fastened to a main body portion 93 via a threaded fastener 98 to permit tightening of threaded fastener 98 to exert a clamping and locking force upon slidable clamp member 90 to prevent relative movement of slidable clamp member 90 and transverse main member 84. Slidable clamp member 90 can further comprise a finger portion 99 engageable with side rail members 86 for capturing transverse main member 84 relative to side rail members 86, thereby coupling transverse main member 84 to sidewalls 108 of cargo box 102.

Figure 14:
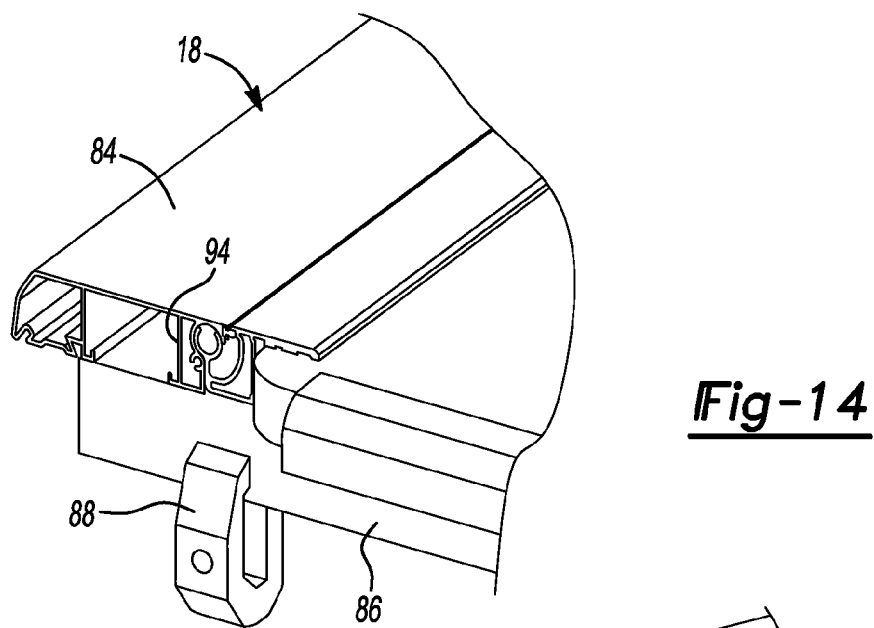
FIG. 14 is an enlarged perspective view illustrating the front mounting bar assembly with portions removed for clarity.
Figure 17:
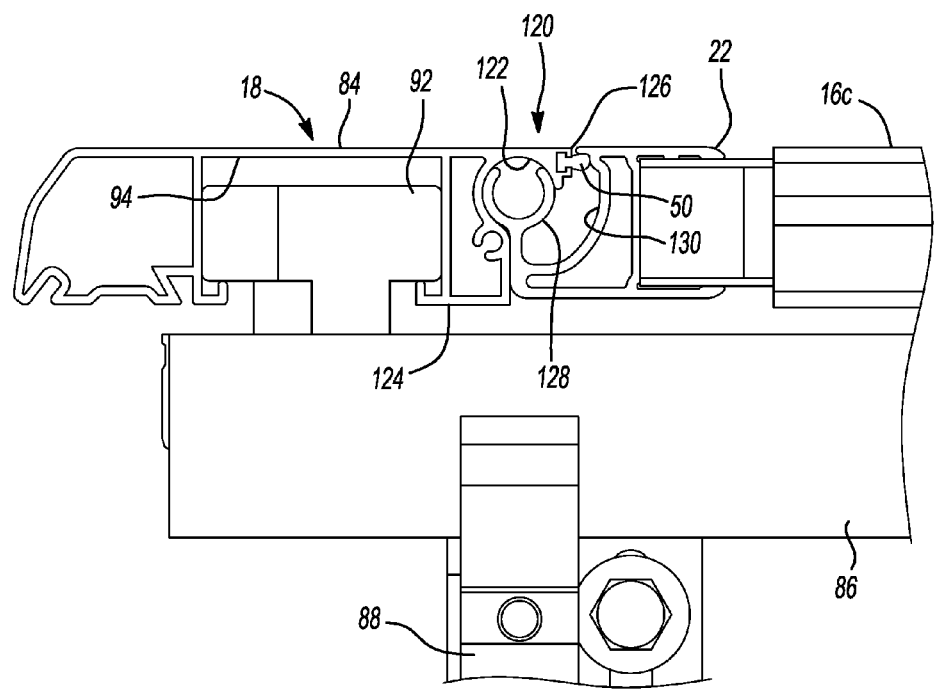
FIG. 17 is an enlarged side view illustrating the front mounting bar assembly with portions removed for clarity.

With particular reference to FIGS. 14 and 17, in some embodiments, front mounting bar assembly 18 can comprise a third hinge assembly 120 can comprise an arcuate channels 122, a central portion 124 disposed there below, and a top surface portion 126 extending along a top surface of third hinge assembly 120. Top surface portion 126 can be generally planar and coplanar with top surface 17 of foldable tonneau system 12. Arcuate channel 122 can be shaped to be substantially cylindrical and sized to receive a corresponding cylindrical member 128 extending from front rail member 22 of third tonneau section 16c. Cylindrical member 128 is pivotally received within arcuate channel 122 such that cylindrical member 128 pivots relative to arcuate channel 122 about an axis. During such pivotal movement, distal end of top surface portion 126 sweeps along an arcuate cutout 130 formed in front rail member 22. Seal member 50 can be provided along a distal end of top surface portion 126 for sealing engagement with front mounting bar assembly 18 and front rail member 22 to define a generally sealed top surface 17. In this way, third tonneau section 16c is permitted to articulate or pivot about the axis into a raised position vertically adjacent passenger cabin 104 to permit access of the forward portion of cargo box 102.

With reference to FIG. 11, in some embodiments, rear rail member 24 of third tonneau section 16c can comprise a seal member 50 disposed at a distal end of a top surface 132 for engaging a corresponding surface of attachment member assembly 40.

Figure 4:
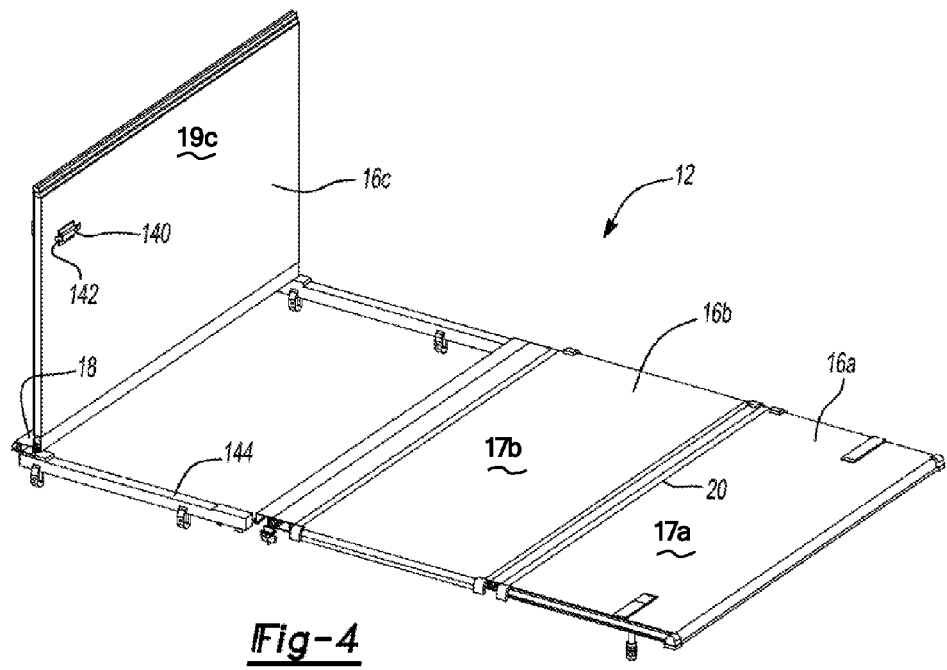
FIG. 4 is a perspective view illustrating the folding tonneau cover having the third tonneau section in a raised position.
Figure 15:
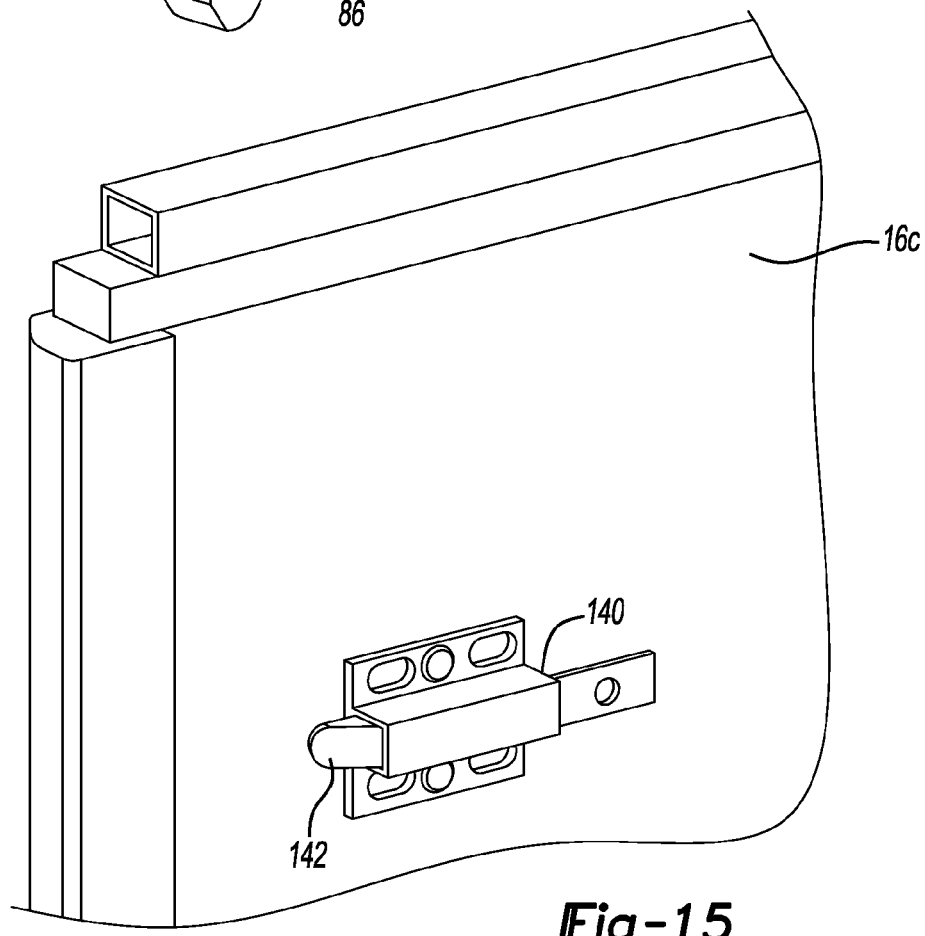
FIG. 15 is an enlarged perspective view illustrating a latching system for the third tonneau section.
Figure 16:
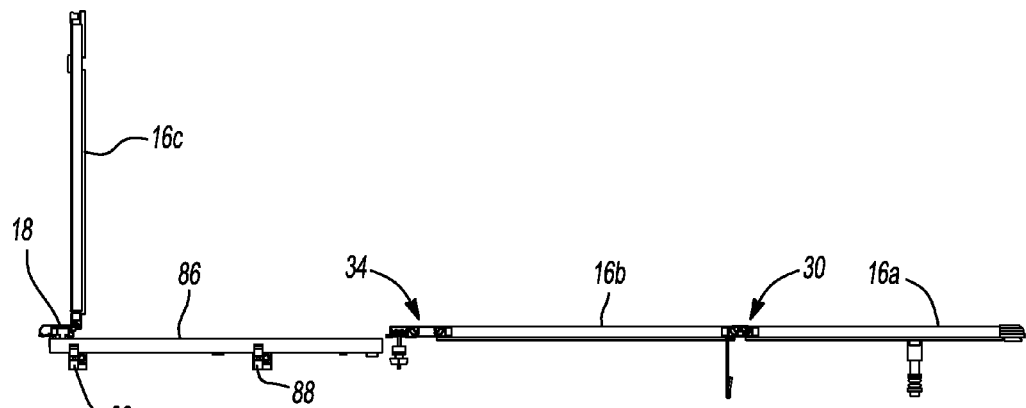
FIG. 16 is a side view illustrating the folding tonneau cover having the third tonneau section in a raised position.

With reference to FIGS. 4 and 15, in some embodiments, third tonneau section 16c can be retained in a lowered and locked position via one or more latch members 140. Latch members 140 can each comprise a striker member 142 engageable with a striker plate 144. Striker plate 144 can comprise an existing flange of side rail member 86. Striker member 142 can be biased in a latched position and retracted by a user to disengage striker member 142 from striker plate 144.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau cover system for a cargo box of a pickup truck, said tonneau cover system comprising:
    a first tonneau section, a second tonneau section, and a third tonneau section generally covering the cargo box of the pickup truck, said first, second, and third tonneau sections each having a top surface and an opposing bottom surface;
    a first hinge system hingedly coupling said first tonneau section and said second tonneau section to permit pivotal stacked nesting of said first tonneau section upon said second tonneau section such that said top surface of said first tonneau section faces said top surface of said second tonneau section;
    a second hinge system hingedly coupling said second tonneau section to an attachment member assembly to permit pivotal stacked nesting of the combination of said first tonneau section and said second tonneau section upon said third tonneau section such that said bottom surface of said first tonneau section faces said top surface of said third tonneau section, said attachment member assembly being directly connectable to the cargo box of the pickup truck; and
    a third hinge system hingedly coupling said third tonneau section to a front mounting assembly to permit pivotal movement of only said third tonneau section into a raised position separate from said first tonneau section and said second tonneau section, said front mounting assembly being connectable to the cargo box.

2. The tonneau cover system according to claim 1 wherein said first tonneau section, said second tonneau section, and said third tonneau section are generally rigid.

3. The tonneau cover system according to claim 1 wherein said first hinge system is a living hinge system.

4. The tonneau cover system according to claim 1 wherein said second hinge system is a living hinge system.

5. The tonneau cover system according to claim 1 wherein said third hinge system is a living hinge system.

6. The tonneau cover system according to claim 1 wherein said first hinge system comprises:
    a central hinge member having a pair of arcuate channels and a central portion disposed between said pair of arcuate channels; and
    a pair of cylindrical members each being complementarily shaped relative to said pair of arcuate channels, one of said pair of cylindrical members extending from said first tonneau section and the other of said pair of cylindrical members extending from said second tonneau section,
    wherein said central hinge member and said pair of cylindrical members cooperate to provide said hinged coupling of said first tonneau section and said second tonneau section.

7. The tonneau cover system according to claim 6 wherein said second hinge system comprises:
    a central hinge member having a pair of arcuate channels and a central portion disposed between said pair of arcuate channels; and
    a pair of cylindrical members each being complementarily shaped relative to said pair of arcuate channels, one of said pair of cylindrical members extending from said second tonneau section and the other of said pair of cylindrical members extending from said attachment member assembly,
    wherein said central hinge member and said pair of cylindrical members cooperate to provide said hinged coupling of said second tonneau section and said attachment member assembly.

8. The tonneau cover system according to claim 7 wherein said central portion of said second hinge system is longer than said central portion of said first hinge system to permit pivotal stacked nesting of said first tonneau section between said second tonneau section and said third tonneau section.

9. The tonneau cover system according to claim 1 wherein said attachment member assembly comprises:
    a handle assembly positionable into engagement with a sidewall of the cargo box of the pickup truck; and
    a main member extending cross-vehicle carrying said handle assembly.

10. The tonneau cover system according to claim 9 wherein said handle assembly comprises a T-shaped section having a head portion slidably disposed within a channel formed in said main member and a hook member engageable with the sidewall of the cargo box.

11. A tonneau cover system for a cargo box of a pickup truck, said tonneau cover system comprising:
    a plurality of tonneau sections being positionable generally over the cargo box of the pickup truck, said plurality of tonneau sections having at least a first tonneau section, a second tonneau section, and a third tonneau section, said plurality of tonneau sections each having a top surface and a bottom surface and being generally coplanar in an extended position;
    a first hinge system hingedly coupling said first tonneau section and said second tonneau section to permit pivotal stacked nesting of said first tonneau section upon said second tonneau section such that said top surface of said first tonneau section faces said top surface of said second tonneau section;
    a second hinge system hingedly coupling said second tonneau section to an attachment member assembly to permit pivotal stacked nesting of the combination of said first tonneau section and said second tonneau section upon said third tonneau section, said attachment member assembly being directly connectable to the cargo box of the pickup truck; and a third hinge system hingedly coupling said third tonneau section to a front mounting assembly to permit pivotal movement of only said third tonneau section into a raised position separate from said first tonneau section and said second tonneau section, said front mounting assembly being connectable to the cargo box.

12. The tonneau cover system according to claim 11 wherein said first tonneau section, said second tonneau section, and said third tonneau section are generally rigid.

13. The tonneau cover system according to claim 11 wherein said first hinge system is a living hinge system.

14. The tonneau cover system according to claim 11 wherein said second hinge system is a living hinge system.

15. The tonneau cover system according to claim 11 wherein said third hinge system is a living hinge system.

16. The tonneau cover system according to claim 11 wherein said first hinge system comprises:
   a central hinge member having a pair of arcuate channels and a central portion disposed between said pair of arcuate channels; and
   a pair of cylindrical members each being complementarily shaped relative to said pair of arcuate channels, one of said pair of cylindrical members extending from said first tonneau section and the other of said pair of cylindrical members extending from said second tonneau section,
   wherein said central hinge member and said pair of cylindrical members cooperate to provide said hinged coupling of said first tonneau section and said second tonneau section.

17. The tonneau cover system according to claim 11 wherein said second hinge system comprises:
   a central hinge member having a pair of arcuate channels and a central portion disposed between said pair of arcuate channels; and
   a pair of cylindrical members each being complementarily shaped relative to said pair of arcuate channels, one of said pair of cylindrical members extending from said second tonneau section and the other of said pair of cylindrical members extending from said attachment member assembly,
   wherein said central hinge member and said pair of cylindrical members cooperate to provide said hinged coupling of said second tonneau section and said attachment member assembly.

18. The tonneau cover system according to claim 11 wherein said attachment member assembly comprises:
   a handle assembly positionable into engagement with a sidewall of the cargo box of the pickup truck; and
   a main member extending cross-vehicle carrying said handle assembly.

19. The tonneau cover system according to claim 18 wherein said handle assembly comprises a T-shaped section having a head portion slidably disposed within a channel formed in said main member and a hook member engageable with the sidewall of the cargo box.

20. The tonneau cover system according to claim 11 wherein said second hinge system hingedly coupling said second tonneau section to said attachment member assembly to permit pivotal stacked nesting of the combination of said first tonneau section and said second tonneau section upon said third tonneau section such that said bottom surface of said first tonneau section faces said top surface of said third tonneau section.

\* \* \* \* \*